United States Patent
Zhu et al.

(10) Patent No.: US 9,787,376 B2
(45) Date of Patent: Oct. 10, 2017

(54) SYSTEMS, METHODS, AND DEVICES FOR HYBRID FULL-DIMENSIONAL MULTIPLE-INPUT MULTIPLE-OUTPUT

(71) Applicant: Intel IP Corporation, Santa Clara, CA (US)

(72) Inventors: Yuan Zhu, Beijing (CN); Qinghua Li, San Ramon, CA (US); Fangze Tu, Beijing (CN); Xiaogang Chen, Beijing (CN); Feng Xue, Redwood City, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 307 days.

(21) Appl. No.: 14/498,517

(22) Filed: Sep. 26, 2014

(65) Prior Publication Data

US 2015/0195020 A1    Jul. 9, 2015

Related U.S. Application Data

(60) Provisional application No. 61/924,194, filed on Jan. 6, 2014.

(51) Int. Cl.
*H04B 7/04* (2017.01)
*H04B 7/06* (2006.01)
(Continued)

(52) U.S. Cl.
CPC ......... *H04B 7/0456* (2013.01); *H04B 7/0617* (2013.01); *H04B 7/0639* (2013.01);
(Continued)

(58) Field of Classification Search
None
See application file for complete search history.

(56) References Cited

U.S. PATENT DOCUMENTS 8,885,752 B2    11/2014   Shirani-Mehr et al.
2005/0157807 A1    7/2005   Shim et al.
(Continued)

FOREIGN PATENT DOCUMENTS

CN    102412885 A    4/2012
CN    102549939 A    7/2012
(Continued)

OTHER PUBLICATIONS

U.S. Appl. No. 14/511,792, Notice of Allowance, Jan. 29, 2016.
(Continued)

*Primary Examiner* — Ayaz Sheikh
*Assistant Examiner* — Mariela Vidal Carpio
(74) *Attorney, Agent, or Firm* — Stoel Rives LLP

(57) ABSTRACT

According UE is configured to receive a channel state information reference signal (CSI-RS) from an evolved Universal Terrestrial Radio Access Network (E-UTRAN) Node B (eNB), determine channel state information based on the CSI-RS, and send the channel state information to the eNB. The channel state information includes a precoding matrix indicator corresponding to a first precoding matrix. The UE is also configured to receive a UE specific reference (UE-RS) signal and a physical downlink shared channel (PDSCH) signal. The UE-RS is precoded with a second precoding matrix. The UE estimates a UE-RS effective channel including the second precoding matrix based on the UE-RS and decodes data from the PDSCH signal based on an the first precoding matrix and the UE-RS effective channel.

7 Claims, 7 Drawing Sheets

(51) Int. Cl.
*H04L 25/02* (2006.01)
*H04L 5/00* (2006.01)
*H04W 88/02* (2009.01)
*H04B 7/0456* (2017.01)
*H04W 88/08* (2009.01)

(52) U.S. Cl.
CPC ........ *H04L 25/0204* (2013.01); *H04L 5/0051* (2013.01); *H04W 88/02* (2013.01); *H04W 88/08* (2013.01)

(56) References Cited

U.S. PATENT DOCUMENTS

| | | |
|---|---|---|
| 2007/0155336 A1 | 7/2007 | Nam et al. |
| 2008/0080449 A1 | 4/2008 | Huang et al. |
| 2008/0233902 A1 | 9/2008 | Pan et al. |
| 2009/0202014 A1 | 8/2009 | Mujtaba et al. |
| 2010/0118989 A1* | 5/2010 | Sayana ............. H04L 5/0035 375/260 |
| 2011/0019775 A1 | 1/2011 | Ruscitto et al. |
| 2011/0149765 A1* | 6/2011 | Gorokhov ........... H04L 1/0026 370/252 |
| 2011/0150114 A1 | 6/2011 | Miao et al. |
| 2011/0164696 A1 | 7/2011 | Choi et al. |
| 2011/0194504 A1 | 8/2011 | Gorokhov et al. |
| 2011/0211628 A1 | 9/2011 | Hammarwall et al. |
| 2011/0211656 A1 | 9/2011 | Kent et al. |
| 2011/0216846 A1* | 9/2011 | Lee ................. H04B 7/0473 375/295 |
| 2011/0244847 A1 | 10/2011 | Mallik et al. |
| 2011/0268166 A1 | 11/2011 | Chen et al. |
| 2011/0274185 A1 | 11/2011 | Gan et al. |
| 2011/0280188 A1 | 11/2011 | Jeon et al. |
| 2011/0317748 A1 | 12/2011 | Li et al. |
| 2012/0008613 A1 | 1/2012 | Lee et al. |
| 2012/0014424 A1 | 1/2012 | Heath et al. |
| 2012/0033566 A1 | 2/2012 | Porat et al. |
| 2012/0114064 A1 | 5/2012 | Kotecha et al. |
| 2012/0250608 A1* | 10/2012 | Wang ............... H04B 7/0421 370/328 |
| 2012/0281783 A1 | 11/2012 | Cheng et al. |
| 2012/0320841 A1* | 12/2012 | Miki ................ H04B 7/0689 370/329 |
| 2013/0242773 A1 | 9/2013 | Wernersson et al. |
| 2013/0258964 A1 | 10/2013 | Nam et al. |
| 2013/0265899 A1 | 10/2013 | Sayana et al. |
| 2013/0287064 A1* | 10/2013 | Seo ................... H04J 13/18 375/144 |
| 2013/0315184 A1* | 11/2013 | Kim ................ H04W 72/0406 370/329 |
| 2014/0153427 A1* | 6/2014 | Seo .................. H04L 1/20 370/252 |
| 2014/0314041 A1* | 10/2014 | Kim .................. H04L 5/0048 370/329 |
| 2014/0328312 A1* | 11/2014 | Seo ................. H04L 1/1861 370/329 |
| 2015/0017927 A1* | 1/2015 | Kim ................ H04B 17/318 455/67.13 |
| 2015/0055581 A1* | 2/2015 | Janis ................ H04B 7/046 370/329 |
| 2015/0117350 A1* | 4/2015 | Seo .................. H04L 1/06 370/329 |
| 2015/0124732 A1* | 5/2015 | Seo .................. H04L 5/0048 370/329 |
| 2015/0124736 A1 | 5/2015 | Ko et al. |
| 2015/0181570 A1* | 6/2015 | Sorrentino ........ H04W 72/1205 370/329 |
| 2015/0189626 A1* | 7/2015 | Zhu .................. H04W 72/042 370/329 |
| 2015/0245381 A1* | 8/2015 | Nammi ............ H04L 5/0051 370/329 |

FOREIGN PATENT DOCUMENTS

| | | | | |
|---|---|---|---|---|
| EP | 2648445 A1 | 10/2013 | | |
| KR | 1020120033342 | 4/2012 | | |
| WO | 0052831 A1 | 9/2000 | | |
| WO | 2009107090 A1 | 9/2009 | | |
| WO | 2010050874 A1 | 5/2010 | | |
| WO | WO2010050874 | * | 5/2010 | .............. H04B 7/06 |
| WO | 2011008519 | 1/2011 | | |
| WO | 2012108913 A1 | 8/2012 | | |
| WO | 2012125931 A1 | 9/2012 | | |
| WO | WO2012125931 | * | 9/2012 | .............. H04B 7/06 |

OTHER PUBLICATIONS

3GPP TS 25.322, "Technical Specification Group Radio Access Network; Radio Link Control (RLC) protocol specification (Release 1999)", V3.18.0, Jun. 2004, 75 pages.
3GPP TS 25.322, "Technical Specification Group Radio Access Network; Radio Link Control (RLC) protocol specification (Release 4)", V4.12.0, Jun. 2004, 78 pages.
3GPP TS 25.322, "Technical Specification Group Radio Access Network; Radio Link Control (RLC) protocol specification (Release 5)", V5.13.0, Dec. 2005, 78 pages.
3GPP TS 25.322, "Technical Specification Group Radio Access Network; Radio Link Control (RLC) Protocol specification (Release 6)", V6.10.0, Jun. 2007, 86 pages.
3GPP TS 36.213, "Technical Specification Group Radio Access Network; Evolved Universal Terrestrial Radio Access (E-UTRA); Physical layer procedures (Release 8)", V8.0.0, Sep. 2007, 13 pages.
3GPP TS 36.213, "Technical Specification Group Radio Access Network; Physical layer procedures (Release 8)", V0.2.0, Oct. 2006, 86 pages.
3GPP TS 36.322, "Technical Specification Group Radio Access Network; Evolved Universal Terrestrial Radio Access (E-UTRA) Radio Link Control (RLC) protocol specification (Release 8)", V8.0.0, Dec. 2007, 35 pages.
Ericsson, "EDGE: Concept Proposal for Enhanced GPRS Revision 1.5", ETSI SMG2 Working Session on EDGE TDoc SMG2 EDGE 006/99, Toulouse, France, Mar. 2-4, 1999, 16 pages.
International Search Report and Written Opinion received for PCT/US2015/010326, mailed Mar. 27, 2015, 11 pages.
Aronsson, et al., "Innovative advanced signal processing algorithms for interference avoidance", Artist4g, Grant Agreement 247223, V. 1.0, Dec. 31, 2010, pp. 1-6, 30, 71-77, 92-96.
D'Amico, et al., "Interference Avoidance Techniques and System Design", Artist4g, Grant Agreement 247223, V. 1.1, Jul. 15, 2012, pp. 1-29 and 177-188.
3GPP TR 36.873, "Technical Specification Group Radio Access Network; Study on 3D channel model for LTE", 3rd Generation Partnership Project, Release 12, V1.2.0, Sep. 2013, 33 pages.
Intel Corporation, "Discussions of UE-RS Based Open Loop MIMO", R1-111597, 3GPP TSG RAN WG1 Meeting #65, Barcelona, Spain, Agenda Item 6.3.2.3, May 9-13, 2011, 4 pages.
QUALCOMM Incorporated, "Open Loop DL MIMO Discussion", R1-111689, 3GPP TSG-RAN WG1 #65, Barcelona, Spain, Agenda Item 6.3.2.3, May 9-13, 2011, 11 pages.

* cited by examiner

SYSTEMS, METHODS, AND DEVICES FOR HYBRID FULL-DIMENSIONAL MULTIPLE-INPUT MULTIPLE-OUTPUT

RELATED APPLICATION

This application claims the benefit under 35 U.S.C. §119 (e) of U.S. Provisional Application No. 61/924,194, filed Jan. 6, 2014, which is hereby incorporated by reference herein in its entirety.

TECHNICAL FIELD

The present disclosure relates to wireless multiple-input multiple-output (MIMO) and more particularly relates to hybrid full-dimensional MIMO (FD-MIMO).

DETAILED DESCRIPTION OF PREFERRED EMBODIMENTS

Wireless mobile communication technology uses various standards and protocols to transmit data between a base station and a mobile communication device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an UTRAN or E-UTRAN, which communicates with the mobile communication device, known as user equipment (UE). A downlink (or DL) transmission can be a communication from the base station (or eNB) to the mobile communication device (or UE), and an uplink (or UL) transmission can be a communication from the mobile communication device to the base station.

Figure 1:
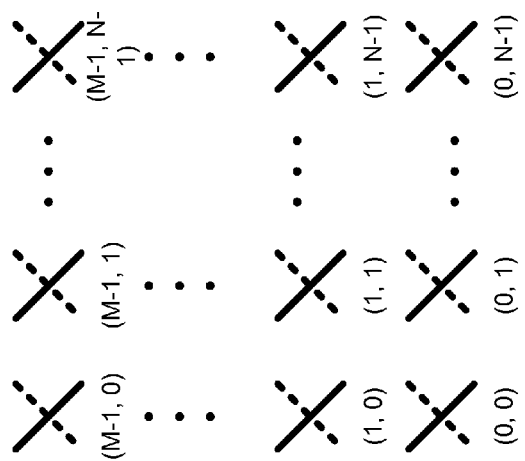
FIG. 1 is a schematic diagram illustrating a two-dimensional planar antenna structure consistent with embodiments disclosed herein.

Recent advance in antenna technologies provides new opportunities to control the beamforming weight of each individual antenna element of a large antenna array. One example of such an antenna array described in 3GPP technical report (TR) 36.873 version 1.2.0 is depicted in FIG. 1 for reference. Specifically, FIG. 1 illustrates a two-dimensional planar antenna structure where each column is a cross-polarized array. The antenna structure includes N number of columns and M number of rows. One possible configuration of M and N is M=10 and N=2. In this example configuration, the 2D planar antenna array contains 40 antenna elements. Half of the antenna elements have slant angle of 45 degrees (dotted lines) and the other half of antenna elements have slant angle of minus 45 degrees (solid lines).

In LTE-Advanced (LTE-A) systems up to Release 11, a cell-specific reference signal (CRS) and a channel state information (CSI) reference signal (CSI-RS) can be used to measure downlink channel state information. Furthermore, the number of antenna ports supported in the LTE-A Release 11 specification is 1, 2, or 4 for CRS and 1, 2, 4, or 8 for CSI-RS. Since the number of ports that the Release 11 specification supports (e.g., maximum of 8) is significantly smaller than the number of antenna elements one large antenna array could have (e.g., 40), the design of multiple-input multiple-output (MIMO) precoding and CSI feedback becomes an open question.

The present disclosure presents systems, methods, and devices for hybrid full-dimensional MIMO. According to one embodiment, a UE is configured to receive a CSI-RS from an eNB, determine channel state information based on the CSI-RS, and send the channel state information to the eNB. The channel state information may include a precoding matrix indicator corresponding to a first precoding matrix. The UE is also configured to receive a UE specific reference (UE-RS) signal and a physical downlink shared channel (PDSCH) signal. The UE-RS may be precoded with a second precoding matrix. The UE estimates a UE-RS effective channel comprising the second precoding matrix based on the UE-RS and decode data from the PDSCH signal based on an the first precoding matrix and the UE-RS effective channel.

In order to improve clarity and to avoid obscuring the disclosure, the embodiments and examples provided herein focus on systems, methods, and apparatuses that operate based on a 3GPP LTE standard. Although terminology and examples of operation are generally directed toward LTE, one of skill in the art will recognize modifications to apply various teachings to other communication standards such as WiFi, WiMAX, and others. Terminology such as UE, eNB, or other terms used in the specification should be understood as encompassing other similar systems or components used in other communication protocols.

A detailed description of systems, devices, and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 2:
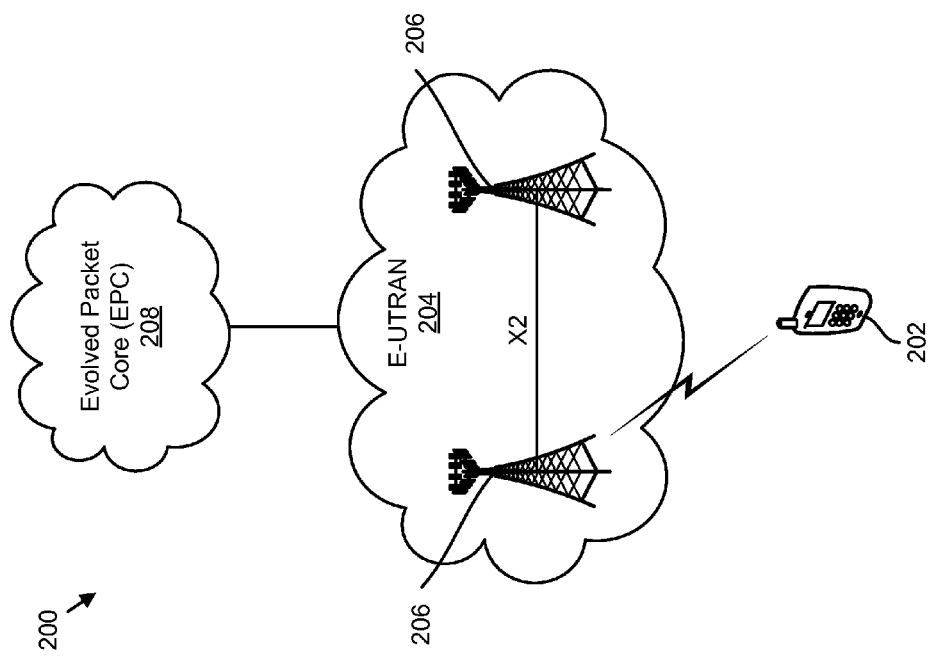
FIG. 2 is a schematic diagram illustrating a communication system for providing communication services to a mobile communication device consistent with embodiments disclosed herein.

FIG. 2 illustrates one embodiment of a communication system 200 for providing communication services to a UE 202. The communication system 200 includes an E-UTRAN 204, which includes eNBs 206, and an evolved packet core (EPC) 208. The UE 202 may include any type of communications and/or computing device. Example UEs 202 include phones, smartphones, personal digital assistants (PDAs), tablet computers, notebook computers, ultrabook computers, or the like. The UE 202 may include a plurality of applications installed and running on the UE 202 which may periodically communicate data over the E-UTRAN 204 and/or EPC 208. The UE 202 may include devices configured to communicate using a 3GPP standard such as universal mobile telecommunication system (UMTS), LTE, LTE-A, or the like. In some embodiments, the UE 202 includes a mobile wireless device configured to communicate based on any other wireless communication standard.

The E-UTRAN 204 is configured to provide wireless data access to the UE 202 and a plurality of other mobile communication devices. The E-UTRAN 204 provides wireless data, voice, and/or other communications available through the EPC 208 to the UE 202, including the plurality of applications installed on the UE 202. In one embodiment, the E-UTRAN 204 operates according to a wireless protocol, such as a wireless protocol that the UE 202 is capable of using. The eNBs 206 may implement transmission point and RNC functions. The eNBs 206 are configured to communicate with each other via an X2 interface, as depicted. In one embodiment, the eNBs 206 are configured to perform beamforming to direct a signal in a direction of the UE 202 and/or to compensate for movement of the UE 202. For example, an eNB 206 may precode a transmission to the UE 202 to transmit in the direction of the UE 202. In one embodiment, the eNB 206 precodes a transmission based on open-loop beamforming, closed-loop beamforming, or both open-loop and closed-loop beamforming. The UE 202 may receive and decode the transmissions based on similar principles in order to interpret or process the received information.

Figure 3:
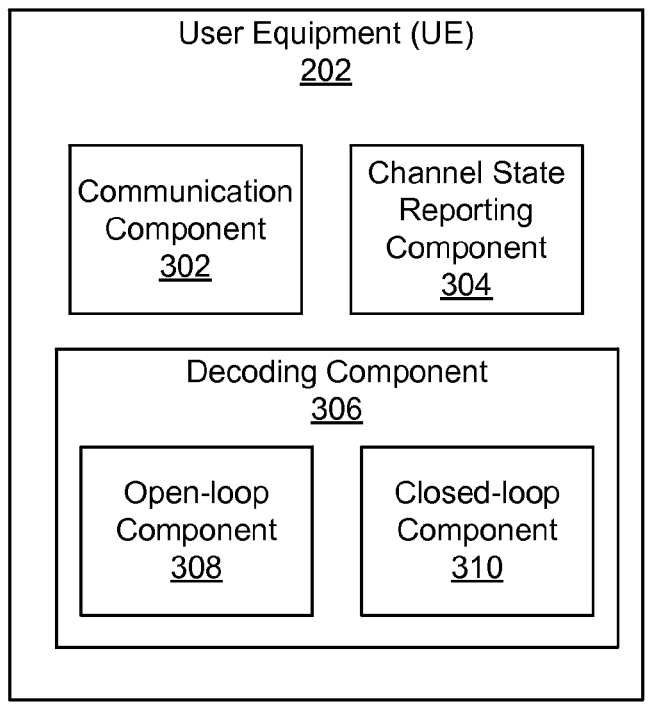
FIG. 3 is a schematic block diagram illustrating one embodiment of a mobile communication device consistent with embodiments disclosed herein.

FIG. 3 is a schematic block diagram illustrating one embodiment of a UE 202. The UE 202 includes a communication component 302, a channel state reporting component 304, and a decoding component 306. The decoding component 306 includes an open-loop component 308 for transmissions precoded based on open-loop design principles and a closed-loop component 310 for transmissions precoded based on closed-loop design principles. The components 302-310 are given by way of example only and may not all be included in all embodiments.

The communication component 302 is configured to provide wireless communication between the UE 202 and an eNB 206. The one embodiment, the communication component 302 sends and receives signals on behalf of the UE 202 and any components of the UE 202. For example, the communication component 302 may include an antenna or wireless radio for wireless communication.

In one embodiment, the communication component 302 receives one or more reference signals for estimating a channel between the UE 202 and an eNB 206. For example, the communication component 302 may receive a CSI-RS from the eNB 206 that can be used to determine a current state of the channel. In one embodiment, the UE 202 sends CSI to the eNB 206 to indicate the current state of the channel. Similarly, the communication component 302 may receive a UE-RS for estimating a channel to demodulate or decode data. In one embodiment, the communication component 302 receives a data transmission that includes data for use by the UE 202 or one or more applications of the UE 202. For example, the data communication may include a physical downlink shared channel (PDSCH) communication that includes encoded data. In one embodiment, a reference signal, data communication, or other communication received by the communication component 202 from the eNB 206 is precoded at the eNB 206 with one or more of an open-loop beamforming matrix and a closed-loop beamforming matrix.

The channel state reporting component 304 is configured to determine CSI for a current channel between the UE 202 and the eNB 206. In one embodiment, the channel state reporting component 304 determines the CSI based on a CSI-RS received from the eNB 206. In one embodiment, the CSI includes a channel quality indicator (CQI), a precoding matrix indicator (PMI), and/or a rank indicator (RI). In one embodiment, the PMI includes an index value that corresponds to a precoding matrix within a codebook. For example, the PMI may be used for closed-loop beamforming and may indicate which matrix best supports the current channel. In one embodiment, the channel state reporting component 304 estimates/measures the effective channel ($H_{eff}$) based on a received reference signal. For example, the effective channel may correspond to the modifications to a data or reference signal by a signal path (e.g., physical channel described by a channel matrix H) and/or any precoding of the reference signal. If a reference signal is precoded with open-loop or closed loop values, the estimated $H_{eff}$ may include the precoded value. For example, if a CSI-RS is precoded with an open-loop precoding matrix $P_c$, $H_{eff}$ may equal $HP_c$ (e.g., $H_{eff}=HP_c$). Using the estimated effective channel, the channel state reporting component 304 may determine a closed-loop matrix, or a PMI corresponding to the closed-loop matrix, to send as part of the CSI.

In one embodiment, the channel state reporting component 304 estimates an effective channel based on other reference signals. For example, the channel state reporting component 304 may estimate an effective channel based on a UE-RS received from the eNB. In one embodiment, the UE-RS is precoded with one or more of an open-loop precoding matrix ($P_c$) and a closed-loop precoding matrix ($P_d$). For example, the closed-loop precoding matrix ($P_d$) may correspond to a PMI sent in the CQI. In one embodiment, the closed-loop precoding matrix ($P_d$) corresponds to a different matrix within the same codebook. For example, the eNB 206 may determine a closed-loop precoding matrix ($P_d$) based on the PMI receive from the UE 206. If the UE-RS is precoded with only the open-loop precoding matrix (Pc), the channel state reporting component 304 may assume that the measured effective channel Heff=HPc. If the UE-RS is precoded with both the open-loop precoding matrix ($P_c$) and the closed-loop precoding matrix, the channel state reporting component 304 may assume that the measured effective channel $H_{eff}=HP_cP_d$. Whether a reference signal (or data transmission) is precoded with an open-loop and/or closed-loop precoding matrix may be preconfigured via a communication standard or by higher layer signaling (e.g., a radio resource configuration [RRC] or medium access control [MAC] layer).

The decoding component 306 is configured to decode a data transmission. In one embodiment, the decoding component 306 decodes a data transmission based on an effective channel and/or based on a determination of what precoding values were used to precode the data communication. For example, the decoding component 306 may decode a PDSCH signal based on one or more reference signals or other signals received from an eNB 206. In one embodiment, decoding based on the channel and/or one or more precoding matrices allows the UE 202 to recover a transmitted signal to improve a signal-to-noise ratio (SNR) or a signal-to-interference-plus-noise ratio (SINR).

In one embodiment, the decoding component 306 is configured to decode a signal that has been precoded with one or more of open-loop precoding values and closed-loop precoding values. For example, open-loop beamforming may not improve SNR or SINR as well as closed-loop beamforming but may be more robust for a fast changing channel. On the other hand, if the channel is not changing quickly, closed-loop beamforming may be more desirable. In one embodiment, the decoding component 306 decodes the data based on preconfigured or measured values for the channel and precoding values.

In one embodiment, the decoding component 306 determines an effective channel and/or an open-loop precoding matrix using an open-loop component 308. In one embodiment, the open-loop component 308 estimates an effective channel ($H_{eff}$) or receives a value for an effective channel from the channel state component. For example, the open-loop component 308 may estimate an effective channel based on a UE-RS received from an eNB 206. In one embodiment, the open-loop component 308 determines an effective channel matrix $H_{eff}$ that is based on open loop beamforming. In one embodiment, for example, $H_{eff}=HP_c$ where $P_c$ comprises an open-loop precoding matrix. In one embodiment, the effective channel matrix $H_{eff}$ is based on both open-loop and closed loop design. In one embodiment, for example, $H_{eff}=HP_cP_d$ where $P_d$ comprises a closed-loop precoding matrix. In one embodiment, $P_c$ has a first dimension corresponding to a number of transmitting antennas and a second dimension corresponding to a number of antenna ports and $P_d$ has a first dimension corresponding to a number of antenna ports and a second dimension corresponding to a number of layers.

In one embodiment, the decoding component 306 determines a closed-loop precoding matrix using a closed-loop component 310. For example, the closed-loop component 310 may determine a value for a closed-loop precoding matrix based on a PMI determined by the channel state reporting component 304 or by a PMI received from the eNB 206. In one embodiment, the PMI is based on an effective channel measured based on a CSI-RS.

In one embodiment, the decoding component 306 decodes a data communication based on both closed-loop precoding and open-loop precoding. For example, the UE 202 may be moving relative to the eNB 206 more quickly in one dimension than in another dimension. For dimensions that are not changing quickly, closed-loop beamforming may be used while open-loop beamforming may be used for dimensions that are changing quickly. By way of example, a UE 202 may be in a train moving quickly in a horizontal direction but slowly in a vertical direction. On the other hand, the UE 202 may be located in an elevator moving quickly in a vertical direction but slowly in a horizontal direction. By decoding based on a hybrid open-loop beamforming matrix and a closed-loop beamforming matrix, the decoding component 306 may be able to provide optimal precoding/encoding despite variations for velocity in different dimensions.

In one embodiment, the decoding component 306 is configured to decode based on one or more additional matrices. For example, the decoding component 306 may assume that a data signal has been precoded with a cyclic delay diversity (CDD) matrix or other matrix. Example assumed effective channels for data may include one or more of $HP_cP_d$, $HP_cD(i)UP_d$, and $HP_cP_dD(i)U$, where D(i) is a cyclic delay diversity matrix for each resource element (RE)i, and both D(i) and U include preconfigured square matrices. In one embodiment, the matrices D(i) and U are derived from a codebook based on either a number of layers or a number of antenna ports. For example, if the assumed effective channel is $HP_cD(i)UP_d$, D(i) and U may include square matrices with dimensions corresponding to a number of antenna ports. As another example, if the assumed effective channel is $HP_cP_dD(i)U$, D(i) and U may include square matrices with dimensions corresponding to a number of layers.

Table 1 illustrates example values for D(i) based on a number of layers. In one embodiment, if D(i) is based on a number of antenna ports, the matrix selected for D(i) is similar except the first column corresponds to a number of antenna ports rather than a number of layers.

TABLE 1

| Number of Layers | D(i) |
|---|---|
| 2 | $\begin{bmatrix} 1 & 0 \\ 0 & e^{\frac{-j2\pi}{2}i} \end{bmatrix}$ |
| 3 | $\begin{bmatrix} 1 & 0 & 0 \\ 0 & e^{\frac{-j2\pi}{3}i} & 0 \\ 0 & 0 & e^{\frac{-j4\pi}{3}i} \end{bmatrix}$ |
| 4 | $\begin{bmatrix} 1 & 0 & 0 & 0 \\ 0 & e^{\frac{-j2\pi}{4}i} & 0 & 0 \\ 0 & 0 & e^{\frac{-j4\pi}{4}i} & 0 \\ 0 & 0 & 0 & e^{\frac{-j6\pi}{4}i} \end{bmatrix}$ |
| 5 | $\begin{bmatrix} 1 & 0 & 0 & 0 & 0 \\ 0 & e^{\frac{-j2\pi}{5}i} & 0 & 0 & 0 \\ 0 & 0 & e^{\frac{-j4\pi}{5}i} & 0 & 0 \\ 0 & 0 & 0 & e^{\frac{-j6\pi}{5}i} & 0 \\ 0 & 0 & 0 & 0 & e^{\frac{-j8\pi}{5}i} \end{bmatrix}$ |
| 6 | $\begin{bmatrix} 1 & 0 & 0 & 0 & 0 & 0 \\ 0 & e^{\frac{-j2\pi}{6}i} & 0 & 0 & 0 & 0 \\ 0 & 0 & e^{\frac{-j4\pi}{6}i} & 0 & 0 & 0 \\ 0 & 0 & 0 & e^{\frac{-j6\pi}{6}i} & 0 & 0 \\ 0 & 0 & 0 & 0 & e^{\frac{-j8\pi}{6}i} & 0 \\ 0 & 0 & 0 & 0 & 0 & e^{\frac{-j10\pi}{6}i} \end{bmatrix}$ |

TABLE 1-continued

| Number of Layers | D(i) |
|---|---|
| 7 | $\begin{bmatrix} 1 & 0 & 0 & 0 & 0 & 0 & 0 \\ 0 & e^{\frac{-j2\pi}{7}i} & 0 & 0 & 0 & 0 & 0 \\ 0 & 0 & e^{\frac{-j4\pi}{7}i} & 0 & 0 & 0 & 0 \\ 0 & 0 & 0 & e^{\frac{-j6\pi}{7}i} & 0 & 0 & 0 \\ 0 & 0 & 0 & 0 & e^{\frac{-j8\pi}{7}i} & 0 & 0 \\ 0 & 0 & 0 & 0 & 0 & e^{\frac{-j10\pi}{7}i} & 0 \\ 0 & 0 & 0 & 0 & 0 & 0 & e^{\frac{-j12\pi}{7}i} \end{bmatrix}$ |
| 8 | $\begin{bmatrix} 1 & 0 & 0 & 0 & 0 & 0 & 0 & 0 \\ 0 & e^{\frac{-j2\pi}{8}i} & 0 & 0 & 0 & 0 & 0 & 0 \\ 0 & 0 & e^{\frac{-j4\pi}{8}i} & 0 & 0 & 0 & 0 & 0 \\ 0 & 0 & 0 & e^{\frac{-j6\pi}{8}i} & 0 & 0 & 0 & 0 \\ 0 & 0 & 0 & 0 & e^{\frac{-j8\pi}{8}i} & 0 & 0 & 0 \\ 0 & 0 & 0 & 0 & 0 & e^{\frac{-j10\pi}{8}i} & 0 & 0 \\ 0 & 0 & 0 & 0 & 0 & 0 & e^{\frac{-j12\pi}{8}i} & 0 \\ 0 & 0 & 0 & 0 & 0 & 0 & 0 & e^{\frac{-j14\pi}{8}i} \end{bmatrix}$ |

Table 2 illustrates example values for U based on a number of layers. In one embodiment, if U is based on a number of antenna ports, the matrix selected for U is similar except the first column corresponds to a number of antenna ports rather than a number of layers.

TABLE 2

| Number of Layers | U |
|---|---|
| 2 | $\frac{1}{\sqrt{2}}\begin{bmatrix} 1 & 1 \\ 1 & e^{\frac{-j2\pi}{2}} \end{bmatrix}$ |
| 3 | $\frac{1}{\sqrt{3}}\begin{bmatrix} 1 & 1 & 1 \\ 1 & e^{\frac{-j2\pi}{3}} & e^{\frac{-j4\pi}{3}} \\ 1 & e^{\frac{-j4\pi}{3}} & e^{\frac{-j8\pi}{3}} \end{bmatrix}$ |
| 4 | $\frac{1}{2}\begin{bmatrix} 1 & 0 & 0 & 0 \\ 0 & e^{\frac{-j2\pi}{4}} & e^{\frac{-j4\pi}{4}} & e^{\frac{-j6\pi}{4}} \\ 0 & e^{\frac{-j4\pi}{4}} & e^{\frac{-j8\pi}{4}} & e^{\frac{-j12\pi}{4}} \\ 0 & e^{\frac{-j6\pi}{4}} & e^{\frac{-j12\pi}{4}} & e^{\frac{-j18\pi}{4}} \end{bmatrix}$ |
| 5 | $\frac{1}{\sqrt{5}}\begin{bmatrix} 1 & 1 & 1 & 1 & 1 \\ 1 & e^{\frac{-j2\pi}{5}} & e^{\frac{-j4\pi}{5}} & e^{\frac{-j6\pi}{5}} & e^{\frac{-j8\pi}{5}} \\ 1 & e^{\frac{-j4\pi}{5}} & e^{\frac{-j8\pi}{5}} & e^{\frac{-j12\pi}{5}} & e^{\frac{-j16\pi}{5}} \\ 1 & e^{\frac{-j6\pi}{5}} & e^{\frac{-j12\pi}{5}} & e^{\frac{-j18\pi}{5}} & e^{\frac{-j24\pi}{5}} \\ 1 & e^{\frac{-j8\pi}{5}} & e^{\frac{-j16\pi}{5}} & e^{\frac{-j24\pi}{5}} & e^{\frac{-j32\pi}{5}} \end{bmatrix}$ |
| 6 | $\frac{1}{\sqrt{6}}\begin{bmatrix} 1 & 1 & 1 & 1 & 1 & 1 \\ 1 & e^{\frac{-j2\pi}{6}} & e^{\frac{-j4\pi}{6}} & e^{\frac{-j6\pi}{6}} & e^{\frac{-j8\pi}{6}} & e^{\frac{-j10\pi}{6}} \\ 1 & e^{\frac{-j4\pi}{6}} & e^{\frac{-j8\pi}{6}} & e^{\frac{-j12\pi}{6}} & e^{\frac{-j16\pi}{6}} & e^{\frac{-j20\pi}{6}} \\ 1 & e^{\frac{-j6\pi}{6}} & e^{\frac{-j12\pi}{6}} & e^{\frac{-j18\pi}{6}} & e^{\frac{-j24\pi}{6}} & e^{\frac{-j30\pi}{6}} \\ 1 & e^{\frac{-j8\pi}{6}} & e^{\frac{-j16\pi}{6}} & e^{\frac{-j24\pi}{6}} & e^{\frac{-j32\pi}{6}} & e^{\frac{-j40\pi}{6}} \\ 1 & e^{\frac{-j10\pi}{6}} & e^{\frac{-j20\pi}{6}} & e^{\frac{-j30\pi}{6}} & e^{\frac{-j40\pi}{6}} & e^{\frac{-j50\pi}{6}} \end{bmatrix}$ |

TABLE 2-continued

| Number of Layers | U |
|---|---|
| 7 | $\frac{1}{\sqrt{7}}\begin{bmatrix} 1 & 1 & 1 & 1 & 1 & 1 & 1 \\ 1 & e^{\frac{-j2\pi}{7}} & e^{\frac{-j4\pi}{7}} & e^{\frac{-j6\pi}{7}} & e^{\frac{-j8\pi}{7}} & e^{\frac{-j10\pi}{7}} & e^{\frac{-j12\pi}{7}} \\ 1 & e^{\frac{-j4\pi}{7}} & e^{\frac{-j8\pi}{7}} & e^{\frac{-j12\pi}{7}} & e^{\frac{-j16\pi}{7}} & e^{\frac{-j20\pi}{7}} & e^{\frac{-j24\pi}{7}} \\ 1 & e^{\frac{-j6\pi}{7}} & e^{\frac{-j12\pi}{7}} & e^{\frac{-j18\pi}{7}} & e^{\frac{-j24\pi}{7}} & e^{\frac{-j30\pi}{7}} & e^{\frac{-j36\pi}{7}} \\ 1 & e^{\frac{-j8\pi}{7}} & e^{\frac{-j16\pi}{7}} & e^{\frac{-j24\pi}{7}} & e^{\frac{-j32\pi}{7}} & e^{\frac{-j40\pi}{7}} & e^{\frac{-j48\pi}{7}} \\ 1 & e^{\frac{-j10\pi}{7}} & e^{\frac{-j20\pi}{7}} & e^{\frac{-j30\pi}{7}} & e^{\frac{-j40\pi}{7}} & e^{\frac{-j50\pi}{7}} & e^{\frac{-j60\pi}{7}} \\ 1 & e^{\frac{-j12\pi}{7}} & e^{\frac{-j24\pi}{7}} & e^{\frac{-j36\pi}{7}} & e^{\frac{-j48\pi}{7}} & e^{\frac{-j60\pi}{7}} & e^{\frac{-j72\pi}{7}} \end{bmatrix}$ |
| 8 | $\frac{1}{2\sqrt{2}}\begin{bmatrix} 1 & 1 & 1 & 1 & 1 & 1 & 1 & 1 \\ 1 & e^{\frac{-j2\pi}{3}} & e^{\frac{-j4\pi}{3}} & e^{\frac{-j6\pi}{3}} & e^{\frac{-j8\pi}{3}} & e^{\frac{-j10\pi}{3}} & e^{\frac{-j12\pi}{3}} & e^{\frac{-j14\pi}{3}} \\ 1 & e^{\frac{-j4\pi}{3}} & e^{\frac{-j8\pi}{3}} & e^{\frac{-j12\pi}{3}} & e^{\frac{-j16\pi}{3}} & e^{\frac{-j20\pi}{3}} & e^{\frac{-j24\pi}{3}} & e^{\frac{-j28\pi}{3}} \\ 1 & e^{\frac{-j6\pi}{3}} & e^{\frac{-j12\pi}{3}} & e^{\frac{-j18\pi}{3}} & e^{\frac{-j24\pi}{3}} & e^{\frac{-j30\pi}{3}} & e^{\frac{-j36\pi}{3}} & e^{\frac{-j42\pi}{3}} \\ 1 & e^{\frac{-j8\pi}{3}} & e^{\frac{-j16\pi}{3}} & e^{\frac{-j24\pi}{3}} & e^{\frac{-j32\pi}{3}} & e^{\frac{-j40\pi}{3}} & e^{\frac{-j48\pi}{3}} & e^{\frac{-j56\pi}{3}} \\ 1 & e^{\frac{-j10\pi}{3}} & e^{\frac{-j20\pi}{3}} & e^{\frac{-j30\pi}{3}} & e^{\frac{-j40\pi}{3}} & e^{\frac{-j50\pi}{3}} & e^{\frac{-j60\pi}{3}} & e^{\frac{-j70\pi}{3}} \\ 1 & e^{\frac{-j12\pi}{3}} & e^{\frac{-j24\pi}{3}} & e^{\frac{-j36\pi}{3}} & e^{\frac{-j48\pi}{3}} & e^{\frac{-j60\pi}{3}} & e^{\frac{-j72\pi}{3}} & e^{\frac{-j84\pi}{3}} \\ 1 & e^{\frac{-j14\pi}{3}} & e^{\frac{-j28\pi}{3}} & e^{\frac{-j42\pi}{3}} & e^{\frac{-j56\pi}{3}} & e^{\frac{-j70\pi}{3}} & e^{\frac{-j84\pi}{3}} & e^{\frac{-j98\pi}{3}} \end{bmatrix}$ |

Figure 4:
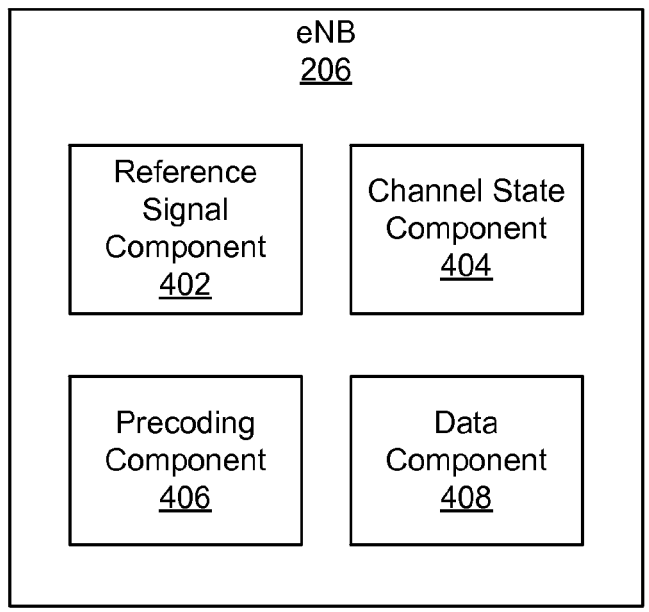
FIG. 4 is a schematic block diagram illustrating one embodiment of a base station consistent with embodiments disclosed herein.

FIG. 4 is a schematic block diagram illustrating one embodiment of an eNB 206. The eNB 206 includes a reference signal component 402, a channel state component 404, a precoding component 406, and a data component 408. The components 402-408 are given by way of example only and may not all be included in all embodiments.

The reference signal component 402 is configured to transmit reference signals to the UE 202. The reference signal component 402 may transmit a CSI-RS, UE-RS, or other reference signal. In one embodiment, the reference signal component 402 transmits a reference signal precoded with an open-loop precoding matrix. The open-loop precoding matrix may also be used for data communications, such as PDSCH communications corresponding to a reference signal. In one embodiment, the reference signal component 402 transmits reference signals using a number of antenna ports less than the number of antennas of the eNB 206. In one embodiment, number of antenna ports used for the reference signal corresponds to a number of ports used for a data transmission.

The channel state component 404 is configured to receive CSI from a UE 202. The CSI may be received in response to sending a CSI-RS to the UE 202. In one embodiment, the CSI includes a precoding index, such as a PMI. In one embodiment, the channel state component 404 determines a closed-loop precoding matrix based on the PMI received from the UE 202. In one embodiment, the closed-loop precoding matrix corresponds to the precoding index in a codebook. In one embodiment, the closed-loop precoding matrix does not correspond to the precoding index received from the UE 202, but the channel state component 404 determines a different matrix based on the received precoding index. In one embodiment, the channel state component 404 determines a closed-loop precoding matrix and/or a precoding index corresponding to the closed-loop precoding matrix for use when encoding a data transmission or a reference signal. In one embodiment, the channel state component 404 sends an indication of the selected closed-loop precoding matrix to the UE 202.

The precoding component 406 is configured to precode a reference signal or a data transmission with one or more precoding matrices. For example, the precoding component 406 may precode a reference signal or data transmission according to any of the examples or embodiments discussed above in relation to the UE 202. In one embodiment, the precoding component 406 precodes a reference signal with one or more of an open-loop precoding matrix (or open-loop precoding values) and/or a closed-loop precoding matrix (or closed-loop precoding values). In one embodiment, the precoding component 406 precodes a data transmission with one or more of an open-loop precoding matrix and/or a closed-loop precoding matrix. In one embodiment, one or more of the open-loop precoding matrix and/or the closed-loop precoding matrix corresponds to the same matrices used to precode a reference signal, such as a CSI-RS or UE-RS. In one embodiment, the precoding component 406 precodes a reference signal or data transmission with one or more third matrices (or third sets of encoding values), such as the D(i) matrix or U matrix discussed above.

The data component 408 is configured to transmit data encoded by the precoding component. For example, the data component 408 may transmit a PDSCH precoded with one or more of the open-loop precoding matrix, closed-loop precoding matrix, and any other precoding matrices.

In light of the foregoing, one full-dimensional MIMO system can be described by:

$$y = HPx + n \quad \text{Equation (1)}$$

where y is the $N_r \times 1$ received vector, H is the $N_r \times N_t$ channel matrix, P is the $N_t \times N_p$ precoding matrix, n is the $N_r \times 1$ noise vector, $N_r$ is the number of receiving antennas, $N_t$ is the number of transmitting antennas, and $N_p$ is the number of layers.

If the antenna array is a two-dimensional antenna array as shown in FIG. 1, $N_t=2NM$ and $N_t$ is usually much larger than 8, the maximum number of antenna ports supported by Release 11. For example when N=2 and M=10, $N_t=40$. Thus, without adding a larger number of antenna ports to the existing antenna port set {1, 2, 4, 8} for CSI-RS, it is possible to virtualize the total $N_t$ antenna elements into $N_c \in \{1, 2, 4, 8\}$ antenna ports by mapping multiple antenna elements to one port. Thus, we can split P into two matrices $P_c$ and $P_d$ and we have the following:

$$y = HP_cP_dx + n = \hat{H}P_dx + n \qquad \text{Equation (2)}$$

where $P_c$ is an $N_t \times N_c$ matrix, $P_d$ is an $N_c \times N_p$ matrix and $\hat{H} = HP_c$ is the effective channel matrix with $N_r \times N_c$.

In this manner, the precoding design problem for P is split into designing $P_c$ and $P_d$. If we assume $P_c$ is designed semi-statically by the eNB 206, $P_d$ is designed by using a codebook to quantize the measured effective channel. And the codebook used to quantize $P_d$ depends on the design of $P_c$.

It is well known that closed-loop beamforming is more suitable for low UE 202 speed and open-loop beamforming is more suitable for medium and high speed beamforming. When UE 202 movement is only modelled in horizontal x-y plane, the Doppler speed per channel path is only dependent on the relative direction between the received channel path on the x-y plane and the direction of UE 202 movement.

Figure 5:
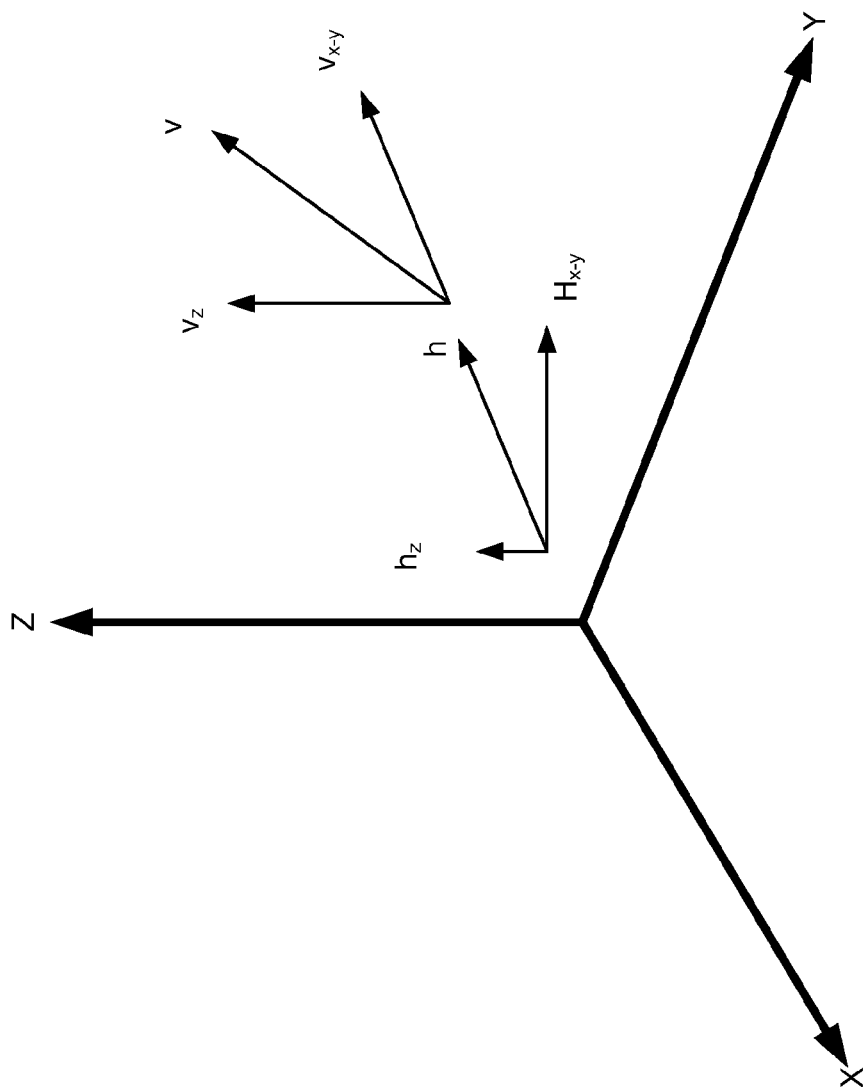
FIG. 5 is a graphical diagram illustrating a relationship between movement of a mobile communication device and a three-dimension channel arrival path consistent with embodiments disclosed herein.

However, when the direction of UE 202 movement is in 3-dimensional space x-y-z, the Doppler speed per channel path is then dependent on the relative angle between the three dimension channel arrival path and the UE 202 movement. Relationship between UE movement and the three-dimension channel arrival path is illustrated in FIG. 5, where v and h are the three-dimensional moving direction of the UE 202 and the arrival channel ray at the receiver, respectively. The moving direction and channel arrival direction vector can be projected onto vertical z dimension as $v_z$, $h_z$ and horizontal dimension in the x-y plane as $v_{x-y}$, $h_{x-y}$. Then the Doppler speed on the vertical z dimension is dependent on $|v_z^H h_z|$ and the Doppler speed on the x-y plane is dependent on $|v_{x-y}^H h_{x-y}|$, where $v_z^H$ is the conjugate transpose of $v_z^H$ and $v_{x-y}^H$ is the conjugate transpose of $v_{x-y}$. In some situations, it is possible that the Doppler speed on the z dimension is significantly different from the Doppler speed on the x-y plane. One such example is that a UE 202 is in the elevator of a skyscraper. In this case the Doppler speed on the x-y plane is much slower than the Doppler speed in the z dimension. Another example is that the UE 202 is in a high speed train. In this case the Doppler speed on the z dimension is much slower than the Doppler speed in the x-y plane. In such cases, it is then possible to apply open-loop MIMO transmission to design the precoding matrix $P_c$ and closed-loop MIMO transmission can to design the precoding matrix $P_d$. One such example is to design $P_c$ using large delay CDD and design $P_d$ using closed loop MIMO.

Figure 6:
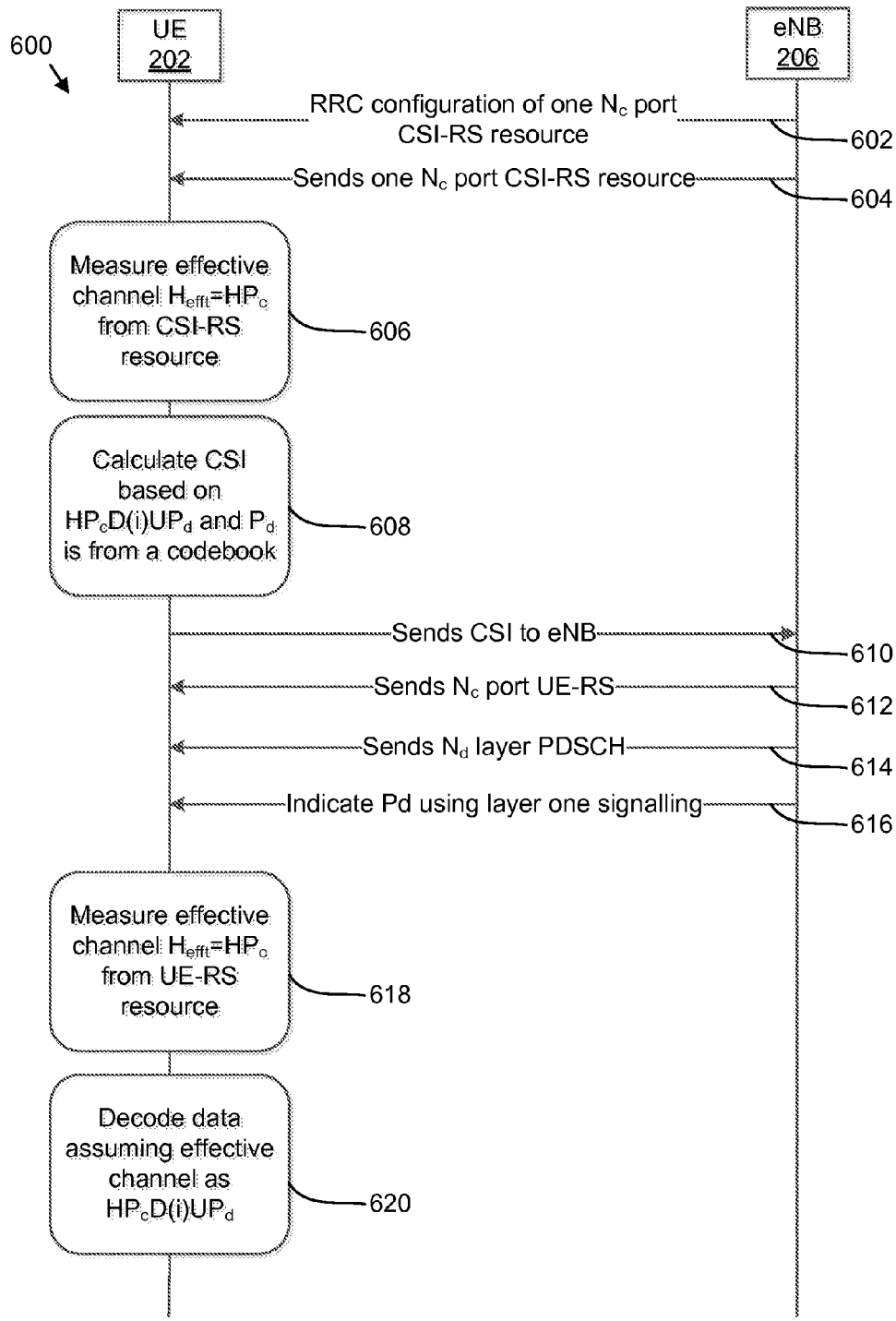
FIGS. 6, 7, and 8 are schematic flow chart diagrams illustrating methods for precoding in FD-MIMO consistent with embodiments disclosed herein.

FIG. 6 is a schematic diagram illustrating a method 600 for full-dimensional hybrid MIMO. In method 600, the precoding design can be described by the following:

$$y = HP_cD(i)UP_dx + n = \hat{H}D(i)UP_dx + n \qquad \text{Equation (3)}$$

where i is the index of a RE, D(i) is the CDD matrix for each RE and U is a fixed $N_c \times N_c$ matrix. The definition of D(i) and U can be found in Tables 1 and 2 above.

The method begins and an eNB 206 sends 602 an RRC message to the UE 202 configuring a CSI-RS having $N_c$ antenna ports. The eNB 206 sends 604 the $N_c$ port CSI-RS to the UE 202 and the UE 202 measures 606 an effective channel $\hat{H}$ or $H_{eff} = HP_c$ based on the CSI-RS and calculates 608 CSI based on $HP_cD(i)UP_d$, and $P_d$ is from a codebook. When deriving CSI, the UE 202 can estimate the effective channel $\hat{H}$ or $H_{eff} = HP_c$ from the $N_c$ port CSI-RS resource and derive the channel capacity for each RE from the equivalent channel $\hat{H}D(i)UP_d$. The UE 202 may then send 610 CSI including values for CQI, PMI, and RI to the eNB 206 using the same feedback format as for closed-loop MIMO in transmission modes (TM) 3, 8, 9, or 10.

The eNB 206 sends 612 an $N_c$ port UE-RS to the UE 206. When decoding PDSCH, the UE-RS can be precoded using:

$$y_{RS} = HP_cx_{RS} + n \qquad \text{Equation (4)}$$

where $x_{RS}$ is an $N_c \times 1$ vector.

The eNB 206 also sends 614 an $N_d$ layer PDSCH and indicates 616 a $P_d$ using layer one downlink control signaling. The UE 202 measures 618 the effective channel to estimate the effective channel $\hat{H} = HP_c$ from the UE-RS. The UE 202 can then derive the full precoding matrix $HP_cD(i)UP_d$ applied to each data RE and perform data RE decoding 620 accordingly.

Figure 7:
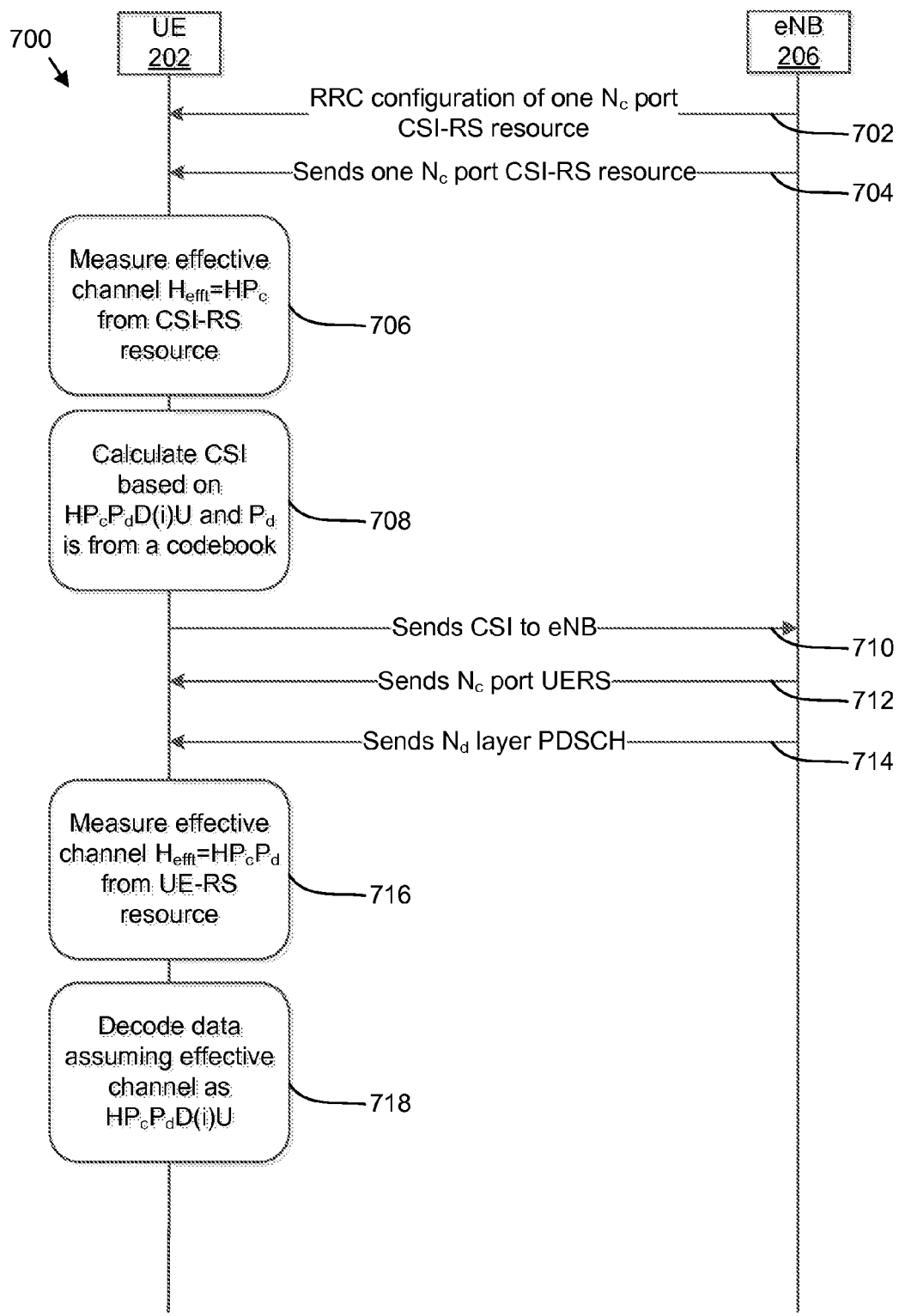

FIG. 7 is a schematic diagram illustrating another method 600 for full-dimensional hybrid MIMO. In method 700, the precoding design for vertical large delay CDD can be defined as:

$$y = HP_cP_dD(i)Ux + n = \hat{H}P_dD(i)Ux + n \qquad \text{Equation (5)}$$

where i is the index of RE, D(i) is the CDD matrix for each RE and U is a constant $N_p \times N_p$ matrix. The definition of D(i) and U can be found in Tables 1 and 2 above.

The method begins and an eNB 206 sends 702 an RRC message to the UE 202 configuring a CSI-RS having $N_c$ antenna ports. The eNB 206 sends 704 the $N_c$ port CSI-RS to the UE 202 and the UE 202 measures 706 an effective channel $\hat{H}$ or $H_{eff} = HP_c$ based on the CSI-RS and calculates 608 CSI based on $HP_cP_dD(i)U$, and $P_d$ is from a codebook. When deriving CSI, the UE 202 can estimate the effective channel $\hat{H}$ from the $N_c$ port CSI-RS resource and derive the channel capacity for each RE from the equivalent channel $\hat{H}P_dD(i)U$. The UE 202 sends 710 CSI including values for CQI, PMI, and RI to the eNB 206. When UE 202 reports a rank greater than 1 (e.g. RI>1), the number of reported CQIs is one instead of two.

The eNB 206 sends 712 an $N_c$ port UE-RS to the UE 206. When decoding a PDSCH, a UE-RS can be precoded using:

$$y_{RS} = HP_cx_{RS} + n \qquad \text{Equation (6)}$$

The eNB 206 also sends 714 an $N_d$ layer PDSCH. The UE 202 can measure or estimate 716 the effective channel $\hat{H} = HP_cP_d$ from the UE-RS. After that, the UE 202 can derive the full precoding matrix $HP_cP_dD(i)U$ to decode 718 each data RE of the PDSCH.

Figure 8:
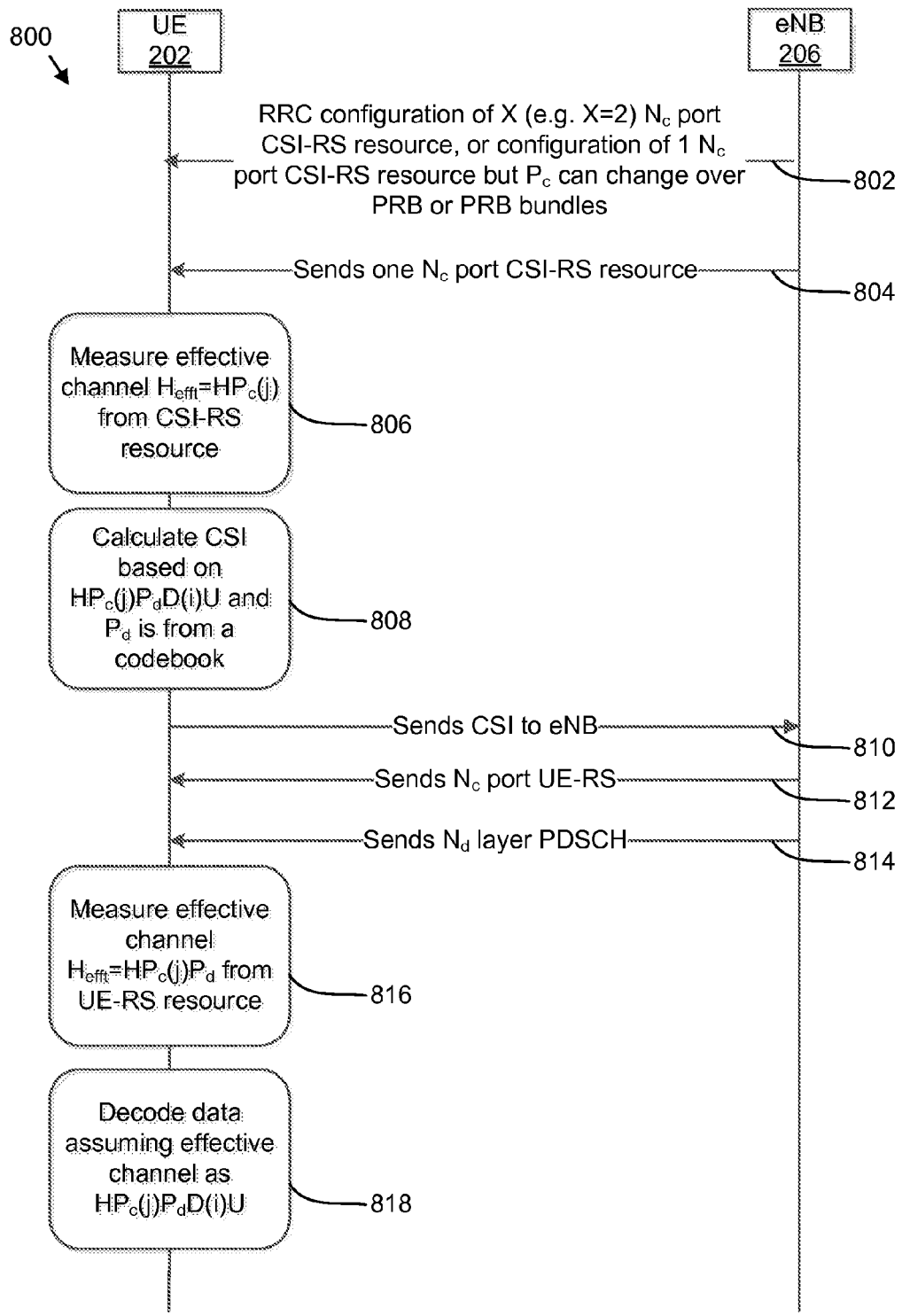

FIG. 8 is a schematic diagram illustrating a method 800 for full-dimensional MIMO if the UE 202 is configured with more than one CSI-RS resource, in one embodiment. For example, the method may apply when two CSI-RS resources are sent and allows the eNB 206 and UE 202 to use different $P_c$ matrices for different CSI-RS resources. The method 800 begins and an RRC message is sent 802 configuring a plurality of $N_c$ port CSI-RS resources. In method 800, the precoding design for CSI-RS can be represented as:

$$y_{CSI-RS}(j) = HP_c(j)x_{CSI-RS}(j) + n(j) \qquad \text{Equation (7)}$$

where $x_{CSI-RS}(j)$ is $N_c \times 1$ vector for the $j^{th}$ CSI-RS resource and $P_c(j)$ is the antenna port virtualization matrix applied to the $j^{th}$ CSI-RS resource. Or, if UE 202 is configured with one CSI-RS resource, eNB 206 can use different $P_c$ for different primary resource block (PRB) pair or PRB bundling for the same CSI-RS resource. This can be represented by Equation (7) where index j is interpreted as a PRB index or PRB bundle index.

The eNB 206 sends 804 a CSI-RS on a configured resource. The UE 202 can measure 806 the effective channel and calculate 808 CSI based on the received CSI-RS. When deriving CSI, the UE 202 can estimate the effective channel $\hat{H}(j)$ from the $j^{th}$ $N_c$ port CSI-RS resource and derive the channel capacity for each RE from the equivalent channel $\hat{H}(j)P_dD(i)U$ for half of the data symbols. One possible way to split data REs is by odd or even data RE index in the frequency first symbol to RE mapping order. The UE sends 810 CSI including CQI, PMI, and RI to the eNB 206. The eNB 206 sends 812 an $N_c$ port UE-RS and an $N_d$ port PDSCH to the UE 202.

When decoding PDSCH, UE-RS can be precoded using:

$$y_{RS}=HP_c(j)P_dx_{RS}+n \quad \text{Equation (8)}$$

Different $P_c(j)$ can be applied to different PRBs. The UE 202 can estimate or measure 816 the effective channel $HP_c(j)P_d$ from the UE-RS and decode 818 the PDSCH RE. The data RE may be precoded using:

$$y=HP_c(j)P_dD(i)Ux+n \quad \text{Equation (9)}$$

Figure 9:
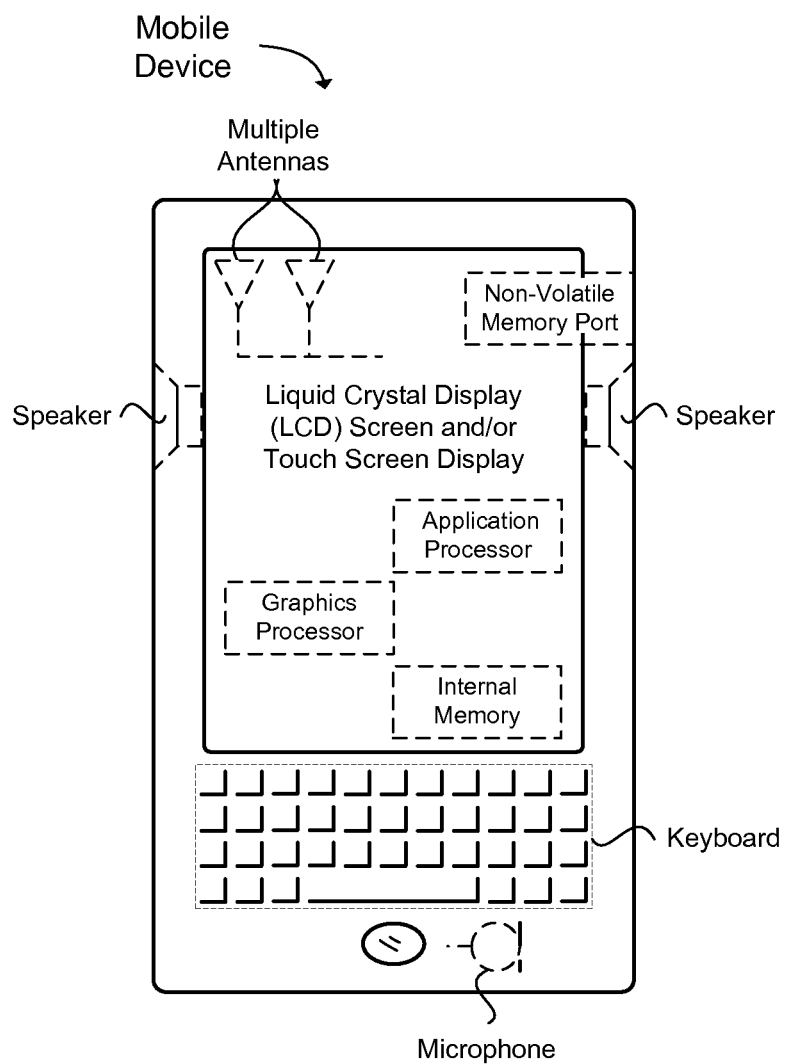
FIG. 9 is a schematic diagram of a mobile device consistent with embodiments disclosed herein.

FIG. 9 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

The following examples pertain to further embodiments.

Example 1 is a UE configured to receive a CSI-RS from an eNB and to determine channel state information based on the CSI-RS and send the channel state information to the eNB. The channel state information includes a precoding matrix indicator corresponding to a first precoding matrix. The UE is configured to receive a UE-RS and a PDSCH signal, wherein the UE-RS is precoded with a second precoding matrix. The UE is configured to estimate a UE-RS effective channel comprising the second precoding matrix based on the UE-RS and to decode data from the PDSCH signal based on the first precoding matrix and the UE-RS effective channel.

In Example 2, the first precoding matrix of Example 1 includes a matrix used for closed-loop beamforming ($P_d$) and the second precoding matrix includes a matrix used for open-loop beamforming ($P_c$). $P_c$ includes a first dimension corresponding to a number of transmitting antennas and a second dimension corresponding to a number of antenna ports. $P_d$ includes a first dimension corresponding to a number of antenna ports and a second dimension corresponding to a number of layers.

In Example 3, decoding data from the PDSCH in any of Examples 1-2 includes decoding further based on a plurality of additional matrices comprising one or more of a channel matrix H, a cyclic delay diversity matrix for each resource element D(i), and a square matrix U.

In Example 4, decoding data from the PDSCH in any of Examples 1-3 includes decoding the data communication based on an assumed effective channel of one or more of $HP_cP_d$, $HP_cD(i)UP_d$, and $HP_cP_dD(i)U$.

In Example 5, estimating the effective channel in any of Examples 1-4 includes estimating a value for $HP_c$.

In Example 6, the UE-RS in any of Examples 1-5 is further precoded with the second precoding matrix and estimating the effective channel includes estimating a value for $HP_cP_d$.

In Example 7, the CSI-RS in any of Examples 1-6 includes a first CSI-RS, the UE-RS includes a first UE-RS, the PDSCH signal includes a first PDSCH signal, and the first precoding matrix includes a first precoding matrix corresponding to the first UE-RS. The UE is further configured to determine second channel state information based on one or more second CSI-RS and send the second channel state information to the eNB. The second channel state information includes one or more second precoding matrix indicators corresponding to one or more second precoding matrices corresponding to the one or more CSI-RS. The UE is further configured to receive one or more second UE-RS and one or more second PDSCH signals and measure one or more second UE-RS effective channels for the one or more the second UE-RS. The UE is further configured to decode data from the one or more second PDSCH signals based on the one or more second UE-RS effective channels and the one or more second precoding matrices.

In Example 8, the UE in any of Examples 1-8 is further configured to measure a CSI-RS effective channel between the UE and the eNB based on the CSI-RS received from the eNB, wherein the CSI-RS comprises a CSI-RS precoded with the second precoding matrix.

Example 9 is a mobile communication device that includes a communication component, an open-loop beamforming component, a closed-loop beamforming component, and a decoding component. The communication component is configured to receive a reference signal from a base station. The open-loop beamforming component configured to determine an effective channel matrix based on the reference signal. The closed-loop beamforming component is configured to determine a precoding matrix index corresponding to a closed-loop precoding matrix using closed-loop beamforming. The decoding component is configured to decode a data communication from the base station based on the effective channel matrix and the closed-loop precoding matrix.

In Example 10, determining the effective channel of Example 9 includes determining a value for $HP_c$ wherein H comprises a channel matrix and $P_c$ comprises an open-loop precoding matrix In Example 11, the effective channel matrix in any of Examples 9-10 is based on the closed-loop precoding matrix and determining the effective channel includes determining a value for $HP_cP_d$. H includes a channel matrix, $P_c$ includes an open-loop precoding matrix, and $P_d$ includes the closed-loop precoding matrix.

In Example 12, decoding the data communication in any of Examples 9-11 includes decoding further based on a plurality of preconfigured matrices including a first matrix D(i) and a second matrix U, wherein the first matrix includes a cyclic delay diversity matrix for each resource element i.

In Example 13, D(i) and U of Example 12 includes matrices predefined in a communication standard.

In Example 14, D(i) and U in any of Examples 12-13 include square matrices with dimensions corresponding to a number of antenna ports of the data communication.

In Example 15, D(i) and U in any of Examples 12-13 include square matrices with dimensions corresponding to a number of layers for the data communication.

Example 16 is an eNB that includes a reference signal component, a channel state component, a precoding component, and a data component. The reference signal component is configured to transmit a CSI-RS to a UE. The CSI-RS is encoded with a first set of precoding values for open-loop MIMO. The channel state component is configured to, in response to transmitting the CSI-RS to the UE, receive channel state information from the UE comprising a precoding index. The precoding component is configured to determine a second set of precoding values for closed-loop MIMO based on the precoding index. The precoding index corresponds to the second set of precoding values in a predefined codebook. The data component is configured to transmit data encoded with the first set of encoding values and the second set of encoding values.

In Example 17, the reference signal component of Example 16 is configured to transmit the CSI-RS on a number of ports less than a number of transmitting antennas. The number of ports of the CSI-RS correspond to a number of ports of the data.

In Example 18, transmitting the data encoded with the first set of encoding values and the second set of encoding values in any of Examples 16-17 further includes transmitting the data encoded with one or more third sets of encoding values.

In Example 19, the third sets of encoding values of Example 18 includes a set of cyclic delay diversity values.

In Example 20, the precoding component in any of Examples 16-19 is further configured to transmit a UE specific reference signal that is encoded with one or more of the first set of precoding values and the second set of precoding values.

Example 21 is a method including receiving a CSI-RS from an eNB and determining channel state information based on the CSI-RS and send the channel state information to the eNB. The channel state information includes a precoding matrix indicator corresponding to a first precoding matrix. The method includes receiving a UE-RS and a PDSCH signal, wherein the UE-RS is precoded with a second precoding matrix. The method includes estimating a UE-RS effective channel that includes the second precoding matrix based on the UE-RS and decoding data from the PDSCH signal based on the first precoding matrix and the UE-RS effective channel.

In Example 22, the first precoding matrix of Example 21 includes a matrix used for closed-loop beamforming ($P_d$) and the second precoding matrix includes a matrix used for open-loop beamforming ($P_c$). $P_c$ includes a first dimension corresponding to a number of transmitting antennas and a second dimension corresponding to a number of antenna ports. $P_d$ includes a first dimension corresponding to a number of antenna ports and a second dimension corresponding to a number of layers.

In Example 23, decoding data from the PDSCH in any of Examples 21-22 includes decoding further based on a plurality of additional matrices comprising one or more of a channel matrix H, a cyclic delay diversity matrix for each resource element D(i), and a square matrix U.

In Example 24, decoding data from the PDSCH in any of Examples 21-23 includes decoding the data communication based on an assumed effective channel of one or more of $HP_cP_d$, $HP_cD(i)UP_d$, and $HP_cP_dD(i)U$.

In Example 25, estimating the effective channel in any of Examples 21-24 includes estimating a value for $HP_c$.

In Example 26, the UE-RS in any of Examples 21-25 is further precoded with the second precoding matrix and estimating the effective channel includes estimating a value for $HP_cP_d$.

In Example 27, the CSI-RS in any of Examples 21-26 includes a first CSI-RS, the UE-RS includes a first UE-RS, the PDSCH signal includes a first PDSCH signal, and the first precoding matrix includes a first precoding matrix corresponding to the first UE-RS. The method further includes determining second channel state information based on one or more second CSI-RS and sending the second channel state information to the eNB. The second channel state information includes one or more second precoding matrix indicators corresponding to one or more second precoding matrices corresponding to the one or more CSI-RS. The method further includes receiving one or more second UE-RS and one or more second PDSCH signals and measuring one or more second UE-RS effective channels for the one or more the second UE-RS. The method further includes decoding data from the one or more second PDSCH signals based on the one or more second UE-RS effective channels and the one or more second precoding matrices.

In Example 28, the method in any of Examples 21-28 further includes measuring a CSI-RS effective channel between the UE and the eNB based on the CSI-RS received from the eNB, wherein the CSI-RS comprises a CSI-RS precoded with the second precoding matrix.

Example 29 is a method including receiving a reference signal from a base station. The method includes determining an effective channel matrix based on the reference signal. The method includes determining a precoding matrix index corresponding to a closed-loop precoding matrix using closed-loop beamforming. The method includes decoding a data communication from the base station based on the effective channel matrix and the closed-loop precoding matrix.

In Example 30, determining the effective channel of Example 29 includes determining a value for $HP_c$ wherein H comprises a channel matrix and $P_c$ comprises an open-loop precoding matrix In Example 31, the effective channel matrix in any of Examples 29-30 is based on the closed-loop precoding matrix and determining the effective channel includes determining a value for $HP_cP_d$. H includes a channel matrix, $P_c$ includes an open-loop precoding matrix, and $P_d$ includes the closed-loop precoding matrix.

In Example 32, decoding the data communication in any of Examples 29-31 includes decoding further based on a plurality of preconfigured matrices including a first matrix D(i) and a second matrix U, wherein the first matrix includes a cyclic delay diversity matrix for each resource element i.

In Example 33, D(i) and U of Example 32 includes matrices predefined in a communication standard.

In Example 34, D(i) and U in any of Examples 32-33 include square matrices with dimensions corresponding to a number of antenna ports of the data communication.

In Example 35, D(i) and U in any of Examples 32-33 include square matrices with dimensions corresponding to a number of layers for the data communication.

Example 36 is method for wireless communication that includes transmitting a CSI-RS to a UE. The CSI-RS is encoded with a first set of precoding values for open-loop MIMO. The method includes, in response to transmitting the CSI-RS to the UE, receiving channel state information from the UE comprising a precoding index. The method includes determining a second set of precoding values for closed-loop MIMO based on the precoding index. The precoding index corresponds to the second set of precoding values in a predefined codebook. The method includes transmitting data encoded with the first set of encoding values and the second set of encoding values.

In Example 37, transmitting the CSI-RS of Example 16 includes transmitting on a number of ports less than a number of transmitting antennas. The number of ports of the CSI-RS correspond to a number of ports of the data.

In Example 38, transmitting the data encoded with the first set of encoding values and the second set of encoding values in any of Examples 36-37 further includes transmitting the data encoded with one or more third sets of encoding values.

In Example 39, the third sets of encoding values of Example 38 includes a set of cyclic delay diversity values.

In Example 40, the method in any of Examples 36-39 further includes transmitting a UE specific reference signal that is encoded with one or more of the first set of precoding values and the second set of precoding values.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. A UE configured to:
    receive a channel state information reference signal (CSI-RS) from an evolved Universal Terrestrial Radio Access Network (E-UTRAN) Node B (eNB);
    determine channel state information based on the CSI-RS and send the channel state information to the eNB, wherein the channel state information comprises a precoding matrix indicator corresponding to a first precoding matrix, wherein the first precoding matrix comprises a matrix used for closed-loop beamforming ($P_d$), and wherein $P_d$ comprises a first dimension corresponding to a number of antenna ports and a second dimension corresponding to a number of layers;
    receive a UE specific reference (UE-RS) signal and a physical downlink shared channel (PDSCH) signal, wherein the UE specific reference signal is precoded with a second precoding matrix, wherein the second precoding matrix comprises a matrix used for open-loop beamforming ($P_c$), and wherein $P_c$ comprises a first dimension corresponding to a number of transmitting antennas and a second dimension corresponding to the number of antenna ports;
    estimate a UE-RS effective channel comprising the second precoding matrix based on the UE-RS; and
    decode data from the PDSCH signal based on the first precoding matrix and the UE-RS effective channel.

2. The UE of claim 1, wherein decoding data from the PDSCH comprises decoding further based on a plurality of additional matrices comprising one or more of:
    a channel matrix H;
    a cyclic delay diversity matrix for each resource element D(i); and
    a square matrix U.

3. The UE of claim 2, wherein the decoding component is configured to decode the data communication based on an assumed effective channel of one or more of:
    $HP_cP_d$;
    $HP_cD(i)UP_d$; and
    $HP_cP_dD(i)U$.

4. The UE of claim 1, wherein estimating the effective channel comprises estimating a value for $HP_c$.

5. The UE of claim 1, wherein the UE-RS is further precoded with the second precoding matrix and wherein estimating the effective channel comprises estimating a value for $HP_cP_d$.

6. The UE of claim 1, wherein the CSI-RS comprises a first CSI-RS, the UE-RS comprises a first UE-RS, the PDSCH signal comprises a first PDSCH signal, and the first precoding matrix comprises a first precoding matrix corresponding to the first UE-RS, wherein the UE is further configured to:
    determine second channel state information based on one or more second CSI-RS and send the second channel state information to the eNB, wherein the second channel state information comprises one or more second precoding matrix indicators corresponding to one or more second precoding matrices corresponding to the one or more CSI-RS;
    receive one or more second UE-RS and one or more second PDSCH signals;
    measure one or more second UE-RS effective channels for the one or more the second UE-RS; and
    decode data from the one or more second PDSCH signals based on the one or more second UE-RS effective channels and the one or more second precoding matrices.

7. The UE of claim 1, wherein the UE is further configured to measure a CSI-RS effective channel between the UE and the eNB based on the CSI-RS received from the eNB, wherein the CSI-RS comprises a CSI-RS precoded with the second precoding matrix.

* * * * *